US010890283B2

(12) United States Patent
Surjaatmadja et al.

(10) Patent No.: US 10,890,283 B2
(45) Date of Patent: Jan. 12, 2021

(54) CONNECTING TUBULAR MEMBERS

(71) Applicant: Halliburton Energy Services, Inc., Houston, TX (US)

(72) Inventors: Jim B. Surjaatmadja, Duncan, OK (US); Stanley V. Stephenson, Duncan, OK (US); Timothy Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 502 days.

(21) Appl. No.: 15/309,525

(22) PCT Filed: Jun. 10, 2014

(86) PCT No.: PCT/US2014/041687
§ 371 (c)(1),
(2) Date: Nov. 8, 2016

(87) PCT Pub. No.: WO2015/191043
PCT Pub. Date: Dec. 17, 2015

(65) Prior Publication Data
US 2017/0146166 A1 May 25, 2017

(51) Int. Cl.
*F16L 21/06* (2006.01)
*F16L 23/00* (2006.01)
*F16L 27/08* (2006.01)
*F16L 21/08* (2006.01)

(52) U.S. Cl.
CPC .............. *F16L 21/06* (2013.01); *F16L 21/08* (2013.01); *F16L 23/003* (2013.01); *F16L 27/0816* (2013.01); *F16L 2201/20* (2013.01)

(58) Field of Classification Search
CPC ......... F16L 21/06; F16L 21/08; F16L 23/003; F16L 27/0816; F16L 2201/20
See application file for complete search history.

(56) References Cited

U.S. PATENT DOCUMENTS

RE21,606 E * 10/1940 Nielsen ................. F16L 21/08
285/332.3
3,999,782 A 12/1976 Shotbolt et al.
4,120,520 A * 10/1978 Ahlstone ................. E02D 5/523
285/18
(Continued)

FOREIGN PATENT DOCUMENTS

CA 2794548 A1 * 9/2011 .......... F16L 27/0816
JP 2013072450 A 4/2013
(Continued)

Primary Examiner — David Bochna
Assistant Examiner — James A Linford
(74) Attorney, Agent, or Firm — John Wustenberg; Parker Justiss, P.C.

(57) ABSTRACT

A tubular connector includes a first tubular member that includes a female end; a second tubular member including a male end insertable into the female end, each of the first and second tubular members including a bore that extends there through; a clamp positionable about the first and second tubular members to urge the male and female ends into sealing engagement; a housing that at least partially encloses the clamp such that a chamber is defined between the clamp and the housing; and a plate positionable between an axial end of the clamp and the housing.

20 Claims, 8 Drawing Sheets

(56) References Cited

U.S. PATENT DOCUMENTS

| | | | | |
|---|---|---|---|---|
| 4,280,723 | A | * | 7/1981 | Moldestad ............ F16L 37/113 |
| | | | | 285/376 |
| 4,302,033 | A | * | 11/1981 | Evans ................. F16L 27/0816 |
| | | | | 285/14 |
| 6,565,129 | B2 | | 5/2003 | Surjaatmadja |
| 2012/0074685 | A1 | | 3/2012 | Huang et al. |
| 2013/0076020 | A1 | | 3/2013 | Lucey et al. |

FOREIGN PATENT DOCUMENTS

| | | |
|---|---|---|
| KR | 1020090079511 A | 7/2009 |
| WO | 2015191043 A1 | 12/2015 |

\* cited by examiner

CONNECTING TUBULAR MEMBERS

CROSS-REFERENCE TO RELATED APPLICATION

This application is the National Stage of, and therefore claims the benefit of, International Application No. PCT/US2014/041687 filed on Jun. 10, 2014, entitled "CONNECTING TUBULAR MEMBERS," which was published in English under International Publication Number WO 2015/191043 on Dec. 17, 2015. The above application is commonly assigned with this National Stage application and is incorporated herein by reference in its entirety.

TECHNICAL BACKGROUND

This disclosure relates to a connecting tubular members, such as, for example, tubular members used to circulate a fluid.

BACKGROUND

Coupling systems are often used to connect corresponding ends of tubular members, such as pipes, conduits, hoses, and/or fluid manifolds. The installation of conventional coupling systems can be complicated, time consuming and often require tools and extensive manual labor. For instance, in the case of surface iron for hydrocarbon fluid systems, such tubular members may conventionally be connected using hammer unions (e.g. coupled with heavy, 10-20 lb. hammers). Such hammers often causes injuries as hammers tend to miss or slip, especially for untrained personnel. It also requires strength to connect these iron connections.

While these hammer unions are commonly used with flow lines with high pressure fluids, they may not protect an individual who accidentally opens a still pressurized flow line. In some cases, malfunctioning measurement devices may report no pressure present; even though significant pressure is still contained in the flow lines. When uncoupled (purposefully or not) at such high pressures (e.g., a high pressure event), tubular members (or high pressure fluid leakage) of the connectors may be urged at great speed away from the connection, thereby causing injury or death. Even when the tubular members are still connected, high pressure fluids could be propelled at a very high velocity (above 400 ft/sec) towards the person uncoupling the flow lines. This high velocity fluid can cause serious injuries or even death.

DETAILED DESCRIPTION

Figure 1:
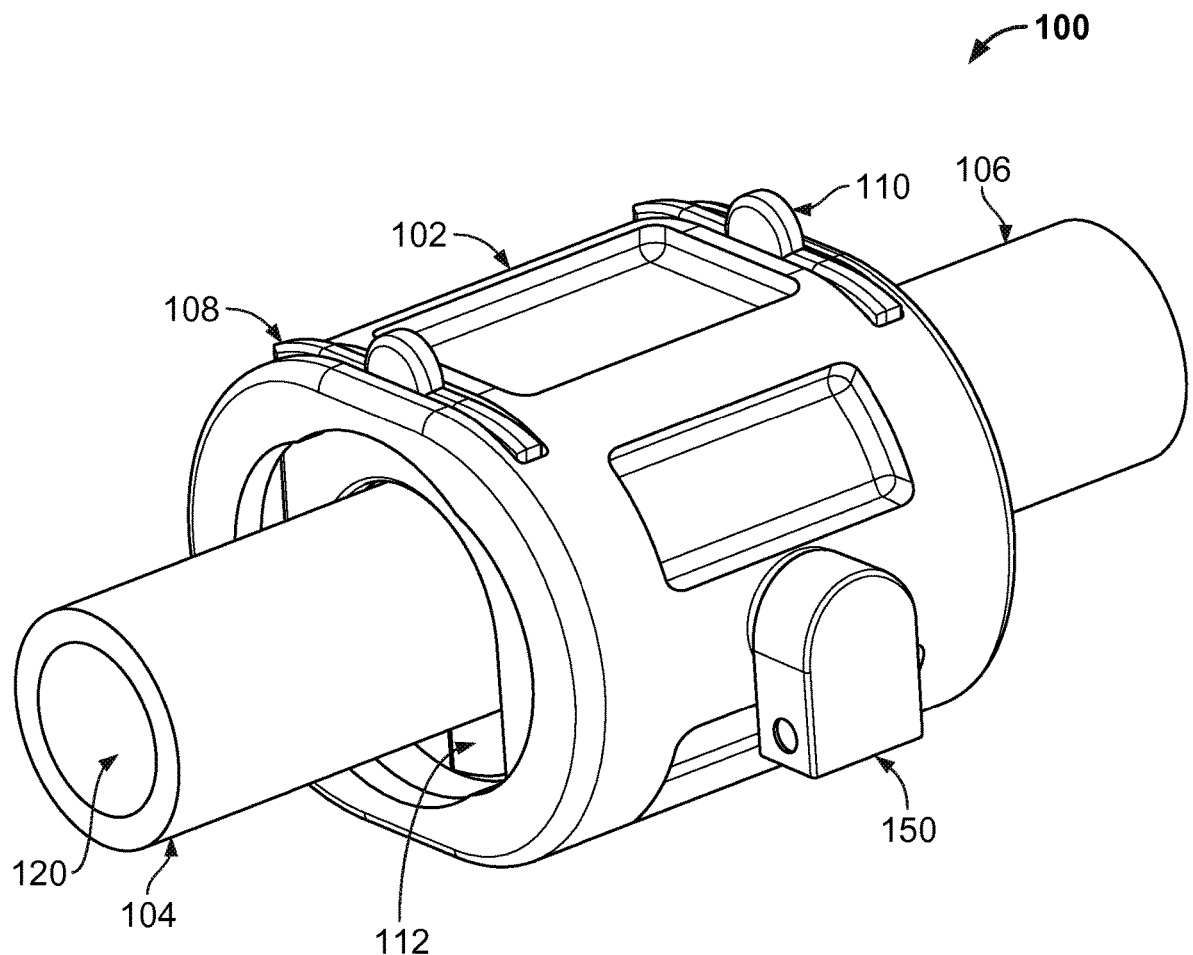
FIG. 1 illustrates an example tubular connector.

The present disclosure describes implementations of a tubular connector that can couple fluid conduits in a system for fluid (e.g., liquid, gas, multiphase) circulation. Such systems may be used in hydrocarbon drilling, production, and/or refining (e.g., in a wellbore through a subterranean zone, on a terranean surface, including sub-sea and sea-based systems). Fluid systems that use one or more of the tubular connectors described herein may also include chemical systems, hydronic systems, or any other fluid flow environments in which the circulatory components (e.g., tubular members, pipes, or otherwise) may be quickly, safely, and efficiently connected and disconnected. In some implementations, the tubular connector includes a clamp that adjustably urges mating ends of tubular members together to form a fluidic connection. A housing surrounds the clamp and defines a blowout chamber therein to radially control fluidic leakage from the tubular members (e.g., during a high pressure fluid event or otherwise). One or more blowout plates may be insertable into the housing to bound axial ends of the clamp and limit axial movement (e.g., ejection) of the tubular members, such as during a high pressure event.

In a general implementation, a tubular connector includes a first tubular member including a female end; a second tubular member including a male end insertable into the female end, each of the first and second tubular members including a bore that extends therethrough; a clamp positionable about the first and second tubular members to urge the male and female ends into sealing engagement; a housing that at least partially encloses the clamp such that a chamber is defined between the clamp and the housing; and a plate positionable between an axial end of the clamp and the housing.

A first aspect combinable with the general implementation further includes a fastener engageable with the clamp through the housing.

In a second aspect combinable with any of the previous aspects, the clamp includes a first portion and a second portion, the first and second portions urgeable together by the fastener.

A third aspect combinable with any of the previous aspects further includes a lock-out assembly positioned on the housing to at least partially cover the fastener.

In a fourth aspect combinable with any of the previous aspects, the fastener includes a manually-rotatable cap coupled to a threaded rod.

In a fifth aspect combinable with any of the previous aspects, the plate includes a first plate, the connector further including a second plate positionable between another axial end of the clamp and the housing opposite the first plate.

In a sixth aspect combinable with any of the previous aspects, the housing includes a respective slot to receive each of the first and second plates therethrough, each respective slot positioned near a respective axial end of the housing.

In a seventh aspect combinable with any of the previous aspects, the housing includes an oblong cross-section.

In an eighth aspect combinable with any of the previous aspects, each of the first and second tubular members includes an expanded diameter shoulder portion, and flanged ends of the clamp abut the expanded diameter shoulder portions.

In another general implementation, a method of fluidly connecting two fluid conduits includes positioning a portion of a first of the two fluid conduits into an adjustable engagement with a portion of a second of the two fluid conduits; radially enclosing the engaged portions of the first and second fluid conduits with an adjustable clamp; tightening the adjustable clamp to create a fluidly seal between respective bores that extend through each of the first and second fluid conduits; and positioning a first plate, through a housing that surrounds the adjustable clamp, into a position between a first axial end of the clamp and a first axial end of the housing.

A first aspect combinable with the general implementation further includes positioning a second plate, through the housing that surrounds the adjustable clamp, into a position between a second axial end of the clamp and a second axial end of the housing.

A second aspect combinable with any of the previous aspects further includes inserting a fastener through the housing and into a threaded connection of the adjustable clamp.

A third aspect combinable with any of the previous aspects further includes reducing a distance between clamping portions of the adjustable clamp by rotating the fastener.

A fourth aspect combinable with any of the previous aspects further includes restricting tightening or loosening of the adjustable clamp with a lock-out assembly.

In a fifth aspect combinable with any of the previous aspects, restricting tightening or loosening of the adjustable clamp with a lock-out assembly includes restricting access to the fastener with a lock-out cover that at least partially covers access to the fastener from an exterior of the housing.

A sixth aspect combinable with any of the previous aspects further includes further tightening the adjustable clamp subsequent to positioning the first plate.

A seventh aspect combinable with any of the previous aspects further includes circulating a fluid through the two fluid conduits subsequent to the further tightening of the adjustable clamp.

An eighth aspect combinable with any of the previous aspects further includes loosening the adjustable clamp to break the fluidic seal between the respective bores that extend through each of the first and second fluid conduits; and radially capturing a fluid that ejects from one or both of the respective bores in a chamber defined between the housing and the adjustable clamp.

A ninth aspect combinable with any of the previous aspects further includes loosening the adjustable clamp to break the fluidic seal between the respective bores that extend through each of the first and second fluid conduits; and exposing one of the two fluid contacts to a pressurized fluid from at least one of the respective bores.

A tenth aspect combinable with any of the previous aspects further includes contactingly engaging a portion of one of the fluid conduits with the adjustable clamp as the one of the fluid conduits is axially urged away from the other of the fluid conduits based at least in part on the exposure to the pressurized fluid; preventing, based on the contacting engagement, the portion of the one of the fluid conduits from ejecting out of an open axial end of the housing.

An eleventh aspect combinable with any of the previous aspects further includes contactingly engaging a portion of one of the fluid conduits with the plate as the one of the fluid conduits is axially urged away from the other of the fluid conduits based at least in part on the exposure to the pressurized fluid; and preventing, based on the contacting engagement, the portion of the one of the fluid conduits from ejecting out of an open axial end of the housing In another general implementation, a fluid management system includes a first pipe; a second pipe; and a coupling that fluidly connects the first and second pipes. The coupling includes a first conduit attached to the first pipe; a second conduit attached to the second pipe and engaged with the first conduit such that a bore extends from the first pipe, through the first and second conduits, and to the second pipe; a split clamp that encircles the first and second conduits and is tightenable to urge the first and second conduits into a fluidly sealing engagement; a housing that at least partially encloses the split clamp and includes open axial ends through which portions of the first and second conduits extend; and a plate insertable into the housing between an axial end of the clamp and an axial end of the housing.

A first aspect combinable with the general implementation further includes another plate insertable into the housing between another axial end of the clamp and another axial end of the housing.

A second aspect combinable with any of the previous aspects further includes an annulus radially defined between the housing and the split clamp, and axially defined between the axial ends of the housing.

In a third aspect combinable with any of the previous aspects, the annulus is further axially defined between the plates.

A fourth aspect combinable with any of the previous aspects further includes a fastener engageable with the split clamp through the housing, split clamp tightenable with the fastener.

In a fifth aspect combinable with any of the previous aspects, the first and second conduits are rotatable about an axis that extends through a center of the bore.

Various implementations of a tubular connector according to the present disclosure may include none, one or some of the following features. For example, the tubular connector may be used in a hydrocarbon fluid system (e.g., a "surface iron" system) in place of hammer unions, thereby reducing effort and/or possibility of injury in joining or unjoining tubular components. As another example, the tubular connector may substantially prevent ejection (and especially high speed ejection) of one or more tubular members during accidental disconnection due to, for instance, a high pressure fluid contained in the members. As yet another example, the tubular connector may substantially prevent or minimize fluid ejection toward personnel from one or more tubular members during disconnection. For example, fluid ejected during such accidental disconnection may eject axially, thus following the tubulars away from the personnel. When the tubulars contain gases (such as foam, or pure nitrogen), an accidental leak or rupture could cause the assembly to fly uncontrollably, causing serious injuries or deaths. One, some, or all of the implementations of a tubular connector described herein may include opposing exit components, thus creating a stabilized, balanced system that does not fly apart. The tubular connector may also provide for a lock out feature that prevents unauthorized disconnection, thereby increasing safety and decreasing injuries and costs related thereto. The tubular connector may further, as compared to other conventional couplings (e.g., hammer unions and otherwise), be lighter and save overall material costs and weight. As another example, the tubular connector may facilitate "finger-tight" connection, thereby removing a requirement for tool tightening.

FIG. 1 illustrates an example tubular connector 100. The tubular connector 100 includes a housing 102, tubular members 104 and 106, plates 108, 110, a clamp 112, and a lock out 150. Tubular members 104, 106 define a bore 120 that extends through the members. Although the tubular members 104, 106 are illustrated as extending from the housing 102 a relatively short distance and then terminating, any type of fluid flow device, such as a pipe, conduit, hose, or manifold (not shown), can be provided on the other end portions of the members 104 and 106 in any conventional manner such as by welding, molding, fastening or the like.

The tubular members 104 and 106 and/or the flow devices can be fabricated from a metal, a composite, or any suitable material. As discussed above and with reference to FIGS. 5-6, the tubular connector 100 can be used in a fluid flow environment (e.g., hydrocarbon, chemical, hydronic, or otherwise) in which fluid (e.g., gas, liquid, multiphase) is circulated through pipes, conduits, flow control devices (e.g., valves), including one or more tubular connectors 100. The tubular connector 100, in some aspects as part of such systems, may provide for a relatively quick, safe, and efficient connection/disconnection location.

Figure 2A:
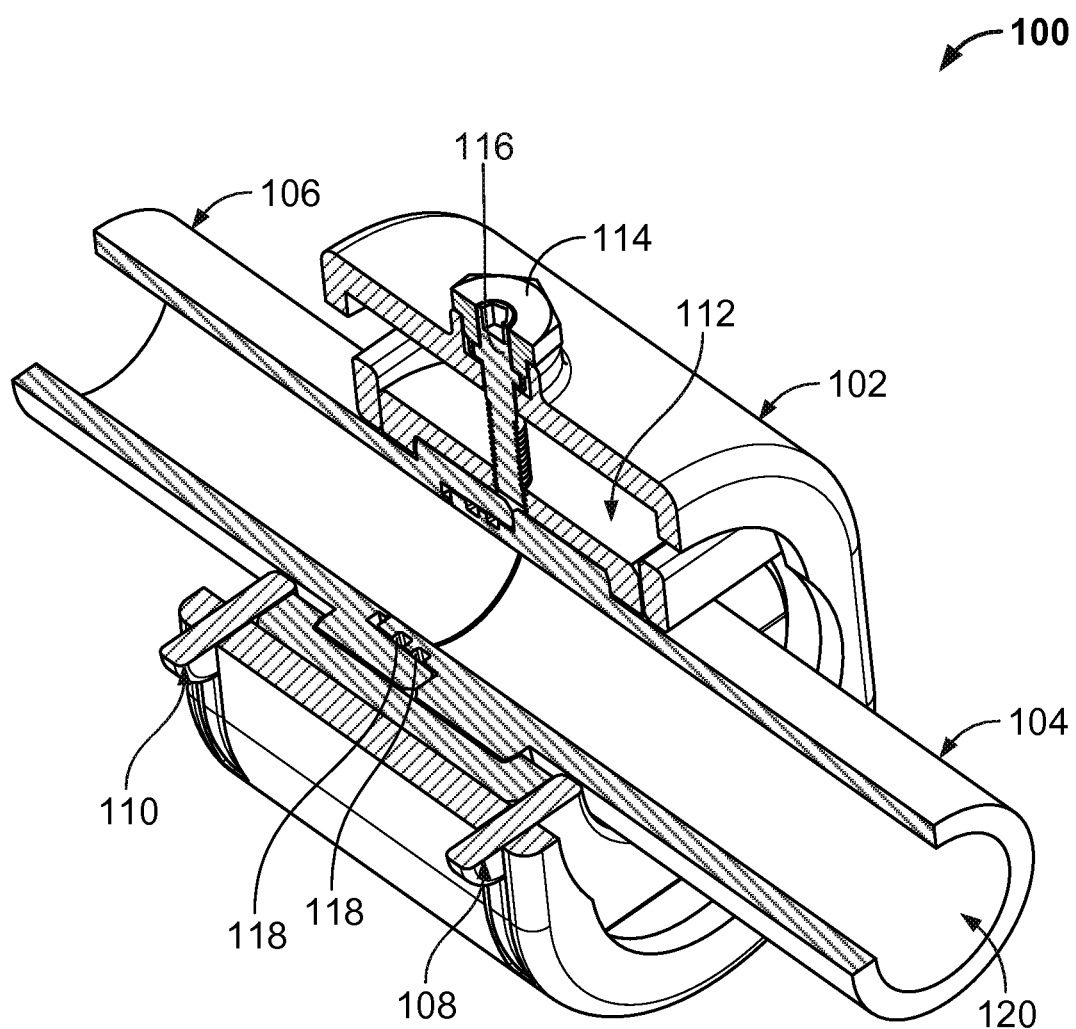
FIGS. 2A-2D illustrate various views of an example implementation of a tubular connector with a portion in cross-section.
Figure 2B:
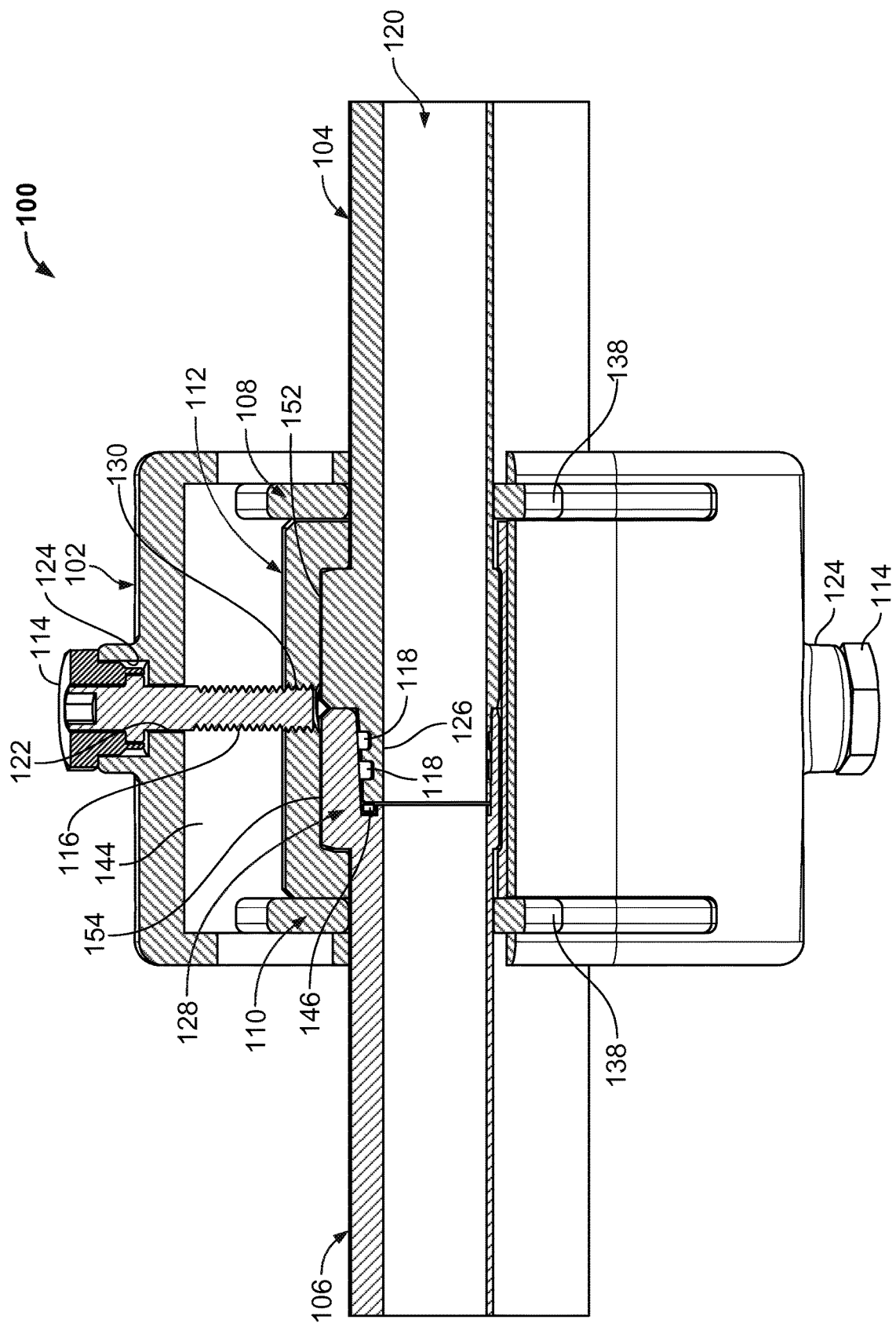
Figure 2C:
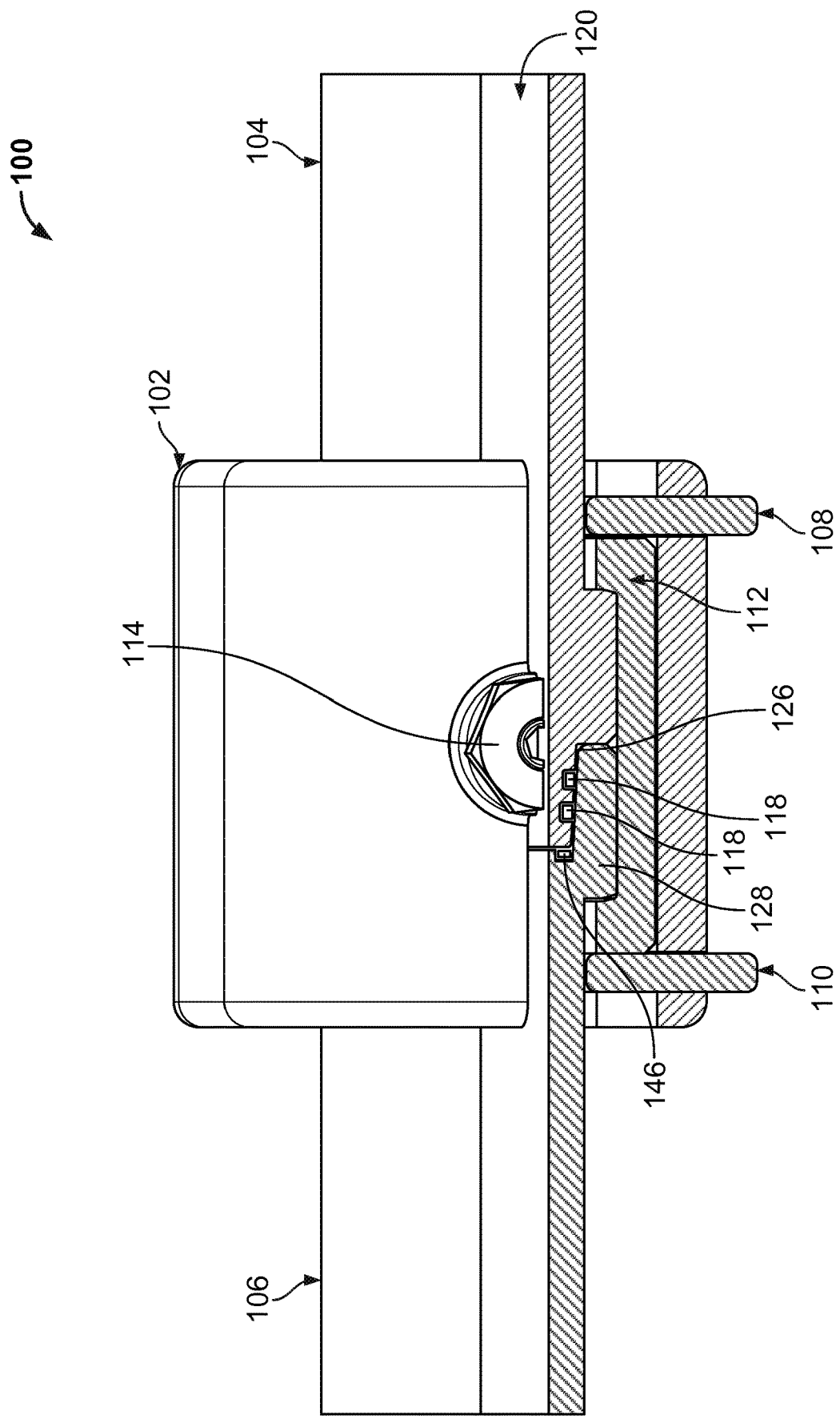
Figure 2D:
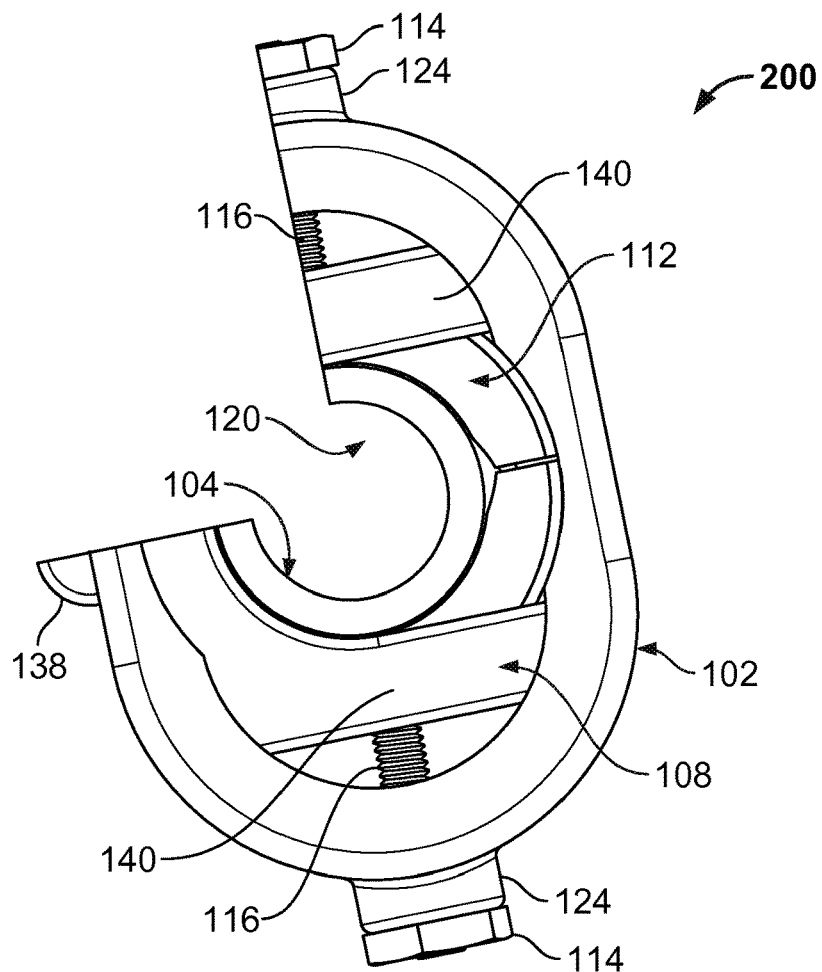

FIGS. 2A-2D illustrate various views of the example tubular connector 100 with a portion in cross-section. FIG. 2A illustrates the tubular connector 100 in isometric view with a quarter cross section to illustrate one or more internal components. FIG. 2B illustrates the tubular connection 100 in a front view. FIG. 2C illustrates the tubular connector 100 in a top view. FIG. 2D illustrates the tubular connector 100 in a right hand view. FIGS. 2A-2D illustrate the tubular connector 100 in an assembled view in which, for example, the tubular members 104 and 106 are sealingly engaged to promote fluid flow through the bore 120.

As illustrated, tubular member 104 comprises a male tubular member 104 and tubular member 106 comprises a female tubular member 106. The male tubular member 104 includes a nose 126 (e.g., a reduced diameter and/or tapered end) that is insertable into a receptacle 128 (e.g., an expanded diameter portion) of the female tubular member 106. In the assembled state, respective shoulders 152/154 of the male tubular member 104 and female tubular member 106, respectively, abut and radial seals 118 (e.g., o-ring seals) form a fluid seal (e.g., completely or substantially) between the nose 126 and the receptacle 128. As further illustrated, a face seal 146 is formed between axial faces of the nose 126 and the receptacle 128 to further promote and/or form the fluid seal between the male tubular connection 104 and the female tubular connector 106.

Figure 3:
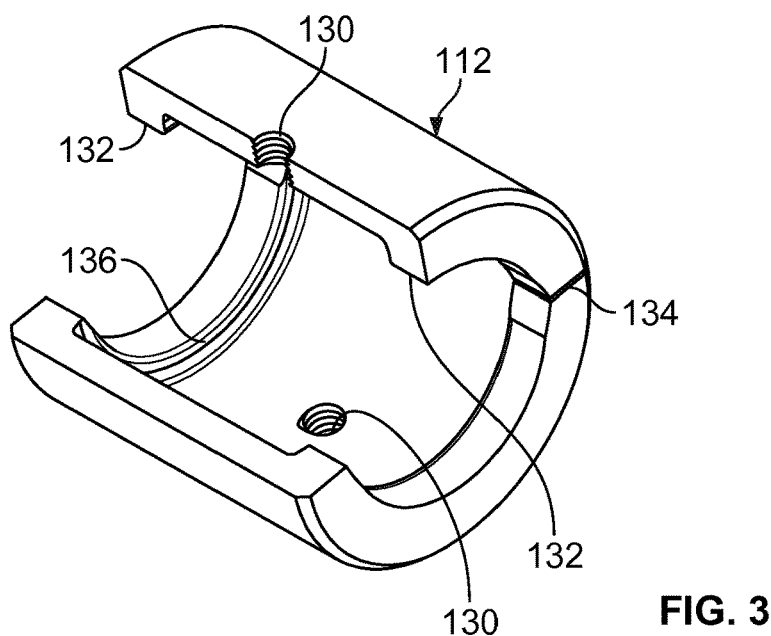
FIG. 3 illustrates an example implementation of a clamp of a tubular connector with a portion in cross-section.

The clamp 112, as shown in the assembled position, radially encircles the tubular members 104, 106 about the shoulders 152, 154 and also axially abuts (e.g., in contact with or with an air gap in between) the shoulders 152, 154. Turning briefly to FIG. 3 as well, the clamp 112 is shown apart from the other components of the tubular connector 100. As illustrated, this example implementation of the clamp 112 includes a split 134 that separates the clamp 112 into semi-circular halves. In other example implementations, the clamp 112 may not include a split but may be hinged or otherwise connected to allow opening/closing of the clamp 112 while in a single piece. As further illustrated, the clamp 112 includes flanges 132 that abut axial ends of the shoulders 152, 154 of the tubular members 104, 106, respectively, when the connector 100 is assembled. In this example implementation of the clamp 112, a chamfer 136 (or other form of beveled edge) may be formed on an inner axial surface of the flanges 132. The chamfer 136, in some aspects, may make assembly (described below) easier in that the tubular members 104, 106 may be more easily pushed together and sealed due, at least in part, to the chamfer 136.

The illustrated housing 102 radially surrounds the clamp 112 and the tubular connectors 104, 106, which extend through axial openings in the housing 102. As illustrated, the housing 102 comprises an obround shape in which ends of the housing 102 (e.g., from which shrouds 124 extend) are radiussed while sides of the housing 102 (e.g., through which plates 108, 110 are inserted as described below) are generally planar. In other example implementations of the housing 102, the shape may be circular, rectangular, or other shape.

As illustrated, shrouds 124 are formed (e.g., welded) on ends of the housing 102 and surround respective holes 122 that extend through the housing. As described more fully below, a fastener 116 is insertable through each hole 122 to extend towards the clamp 112. Although two shrouds 124 and two holes 122 (for two fasteners 116) are shown in this example implementation, there may be a single shroud 124, hole 122, and fastener 116 in particular implementations. Also, particular implementations may have more than two shrouds 124, holes 122, and fasteners 116.

Figure 4A:
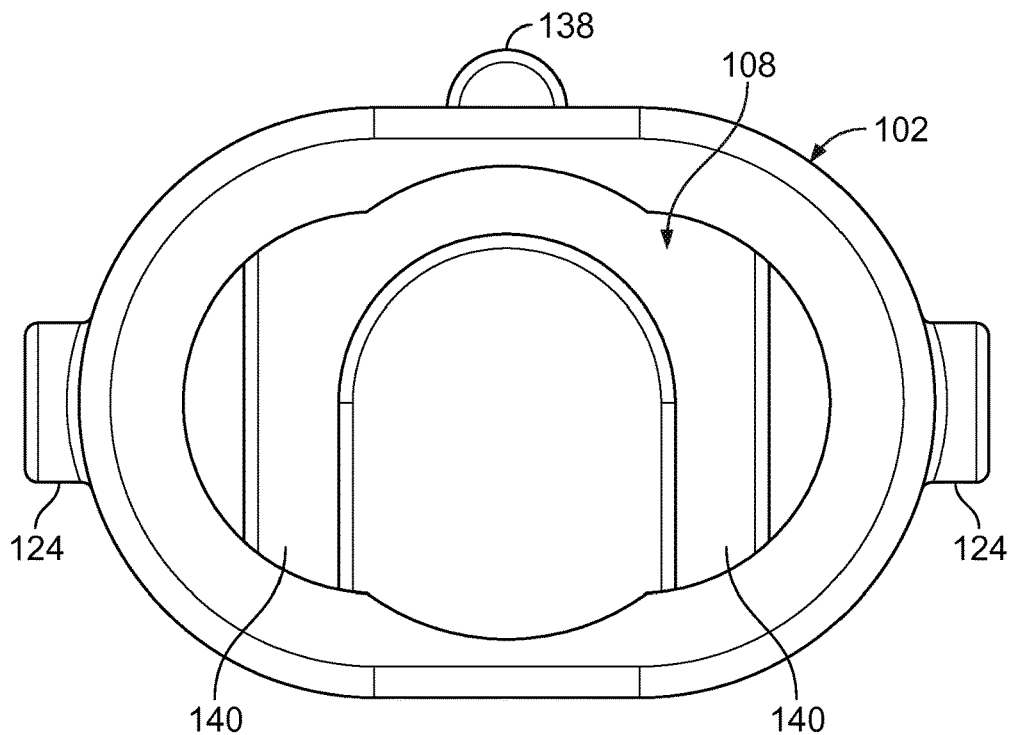
FIGS. 4A-4B illustrate views of a safety sub-assembly of an example implementation of a tubular connector.
Figure 4B:
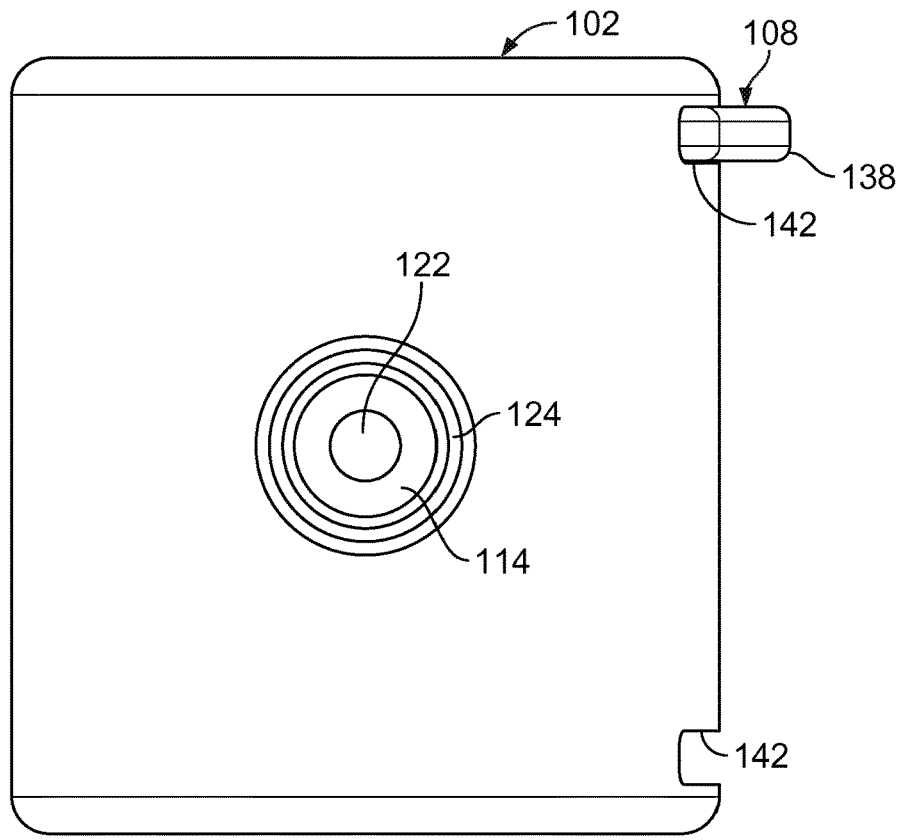

Plates 108, 110 are insertable into the housing 102 into positions axially adjacent the flanges 132 of the clamp 112. Further, the plates 108, 110, as shown, also are positioned, when inserted into the housing 102, axially adjacent (with the clamp flanges 132 in between) the shoulders 126, 129 of the tubular members 104, 106, respectively. Turning briefly to FIGS. 4A-4B, the housing 102 and plates 108, 110 are illustrated separately from the other components of the tubular connect 100. The illustrated housing 102 and the plates 108, 110 form a safety sub assembly. As shown in these figures in combination with FIGS. 2A-2D, the each plate 108, 110 includes a tab 138 that, when the respective plate is inserted into the housing 102, extends from the housing 102 to provide for a grasp point to pull out (or reinsert) the plate into the housing 102. Each plate 108, 110 also includes bars 140 that extend in parallel from the tab 138, and, as shown in FIG. 2D for example, are the portions of the plate that axially abuts the flanges 132 of the clamp 112. Thus, in this example implementation of the plates 108, 110, each plate comprises a horseshoe shape (or "C" shape).

As shown in FIG. 4B, each plate 108, 110 is insertable into the housing 102 through a respective slot 142. In some aspects of operation of the tubular connector 100, only one of the plates 108, 110 may be inserted into a slot 142. In other aspects, both plates 108, 110 may be inserted into respective slots 142. Further, although two plates and two slots are shown in the illustrated example of tubular connector 100, other implementations of the connector 100 may include a single plate and single slot.

A chamber 144, as shown in this example implementation, is radially defined between the housing 102 and the clamp 112, and axially defined between the plates 108, 110. In some aspects, as explained more fully below, the chamber 144 may form a blowout chamber that can collect (e.g., within the bounds of the chamber with no or little external leakage) a fluid that escapes the bore 120 and the tubular connectors 104, 106 (e.g., during a high pressure event). Further in some aspects, the chamber 144 may provide a volume in which particular components of the tubular connector 100 (e.g., the clamp 112, the plates 108, 110) may move due to, for instance, forces created during a high pressure event, while still providing a containment volume for fluid.

The illustrated fastener 116 is insertable through the hole 122 and engages (e.g., threadingly) with an opening 130 (e.g., threaded) of the clamp 112. In some aspects, each fastener 116 (two shown in this implementation) is a lock screw that, when driven (e.g., threaded) into the opening 130 of the clamp 112 urges the semi-circular halves of the clamp 112 together. As shown, the fastener 116 includes a cap 114, thereby allowing for hand turning, where appropriate. In some aspects, however, a tool (e.g., conventional or custom) may be used to tighten or loosen the fastener 116.

The lock-out 150, as shown in FIG. 1, cover all or portions of the cap 114, shroud 124 and/or fastener 116. Generally, in this example implementation, the lock-out 150 is a safety device that prevents (e.g., completely or sufficiently) unauthorized access to the fastener 116 so as to prevent unauthorized disassembly of the tubular connector 100. For example, in some aspects, unauthorized disassembly may be undesirable because disassembly during high pressure operation (e.g., a high pressure fluid circulating through the bore 120) may cause one or more injury-causing accidents.

For example, disassembly of the tubular connector 100 during high pressure operation may cause high pressure fluid leakage and/or high speed ejection of the tubular members 104, 106. While certain components of the tubular connector 100 minimize such effects, in some aspects, it may be desirable to prevent unauthorized disassembly with the lock-out 150. The lock-out 150 may, for example, be a keyed cover, thereby requiring key access to open and expose the fastener 116. In another example, the lock-out 150 alternatively, or additionally, may include a combination lock cover, requiring combination access. In another example, the lock-out 150 may include or comprise a fastener 116 that requires a specialized tool to engage and operate. The lock-out 150 may also, in some aspects, take the form of a safety device within the housing 102. For example, the lock-out 150 may be a member that extends axially through the chamber 144, which is lockable at its ends external to the housing 102, that prevents or retards radially expansion of the clamp 112 (e.g., thereby preventing disassembly of the tubular members 104, 106 once engaged). Such example techniques described above for the lock-out may be used alone or in combination.

The tubular connector 100 may be assembled according to the following example process. Initially, the tubular members 104, 106 may be urged together such that the male tubular member 104 is engaged with the female tubular member 106 (e.g., the nose 126 is engaged into the receptacle 128). Although such insertion may place the tubular members 104, 106 into a stable engagement, a fluidic seal may still not be formed between the tubular members 104, 106. Next, the clamp 112 is applied over the shoulders 152, 154 of the tubular members 104, 106 so that the flanges 132 of the clamp 112 are axially adjacent the shoulders 152, 154. At this time, typically, the clamp 112, which in this example is a two piece clamp, is loosened, and may still be in an unconnected two-piece form. Next, one or both fasteners 116 are inserted through the holes 122 of the housing 102 and into the respective openings 130 of the clamp. In this example, where the openings 130 are threaded (as are the fasteners 116), the fasteners 116 are threadingly tightened to compress the two halves of the clamp 112 around the tubular members 104, 106. Once sufficiently tightened (e.g., by hand or to a particular torque), the clamp 112 urges the tubular members 104, 106 into a fluidic seal. Next, one or both of the plates 108, 110 may be inserted into the respective slots 142 of the housing 102 adjacent axial ends of the clamp 112.

Disassembly of the tubular connector 100 occurs in a substantially opposite order of events as assembly; however, certain steps may be skipped or performed in different orders. For example, the plates 108, 110 may not necessarily be removed, or may be removed after loosening the fasteners 116. In some aspects, the fasteners 116 may also act as "pull" members, thereby allowing a disassembler to pull the clamp halves apart (e.g., to loosen the engagement of the tubular members 104, 106).

In normal operation of a fluid circulation system that include the tubular connector 100, the connector 100 operates to maintain or help maintain a fluidic seal between the tubular members 104, 106. The tubular members 104, 106 may be engaged, disengaged repeatedly by assembling or disassembling the tubular connector 100 as described above. During a purposeful or accidental disassembly of the tubular connector 100 during a high pressure event (e.g., high fluidic pressure in the tubular members 104, 106), the tubular connector 100 may act to prevent dangerous fluid leakage and/or dangerous ejection of the tubular members 104, 106 away from the connector 100. For example, if the clamp 112 is loosened during a high pressure event, thereby disengaging the fluidic seal between the members 104, 106, high pressure fluid may be radially contained (e.g., all or substantially) within the chamber 144 with little to no dangerous leakage. Such leakage may also be contained within the housing 102 due to the plates 108, 110. Further, as the fluid may be radially directed into the chamber 144 and contained in the housing 102, a net axial force (in either direction) on the tubular members 104, 106 may be substantially zero or negligible.

As another example, if the clamp 112 is loosened during a high pressure event, thereby disengaging the fluidic seal between the members 104, 106, the expanding fluidic pressure may rapidly urge the members 104, 106 away from each other (e.g., an ejection event). In some cases, the clamp 112 may be loosened but prevent complete ejection of the members 104, 106 from the housing 102 through contacting interference between the flanges 132 and the shoulders 152, 154. However, in some instances, once loosened, the clamp 112 may fall into the chamber 144 such that there is no (or insufficient) contacting interference between the flanges 132 and the shoulders 152, 154 to prevent ejection of the tubular members 104, 106. In such cases, however, the plates 108, 110 may also provide contacting interference the shoulders 152, 154 of the tubular members 104, 106, thereby preventing (all or substantially) ejection of the members 104, 106 from the housing 102.

Figure 5:
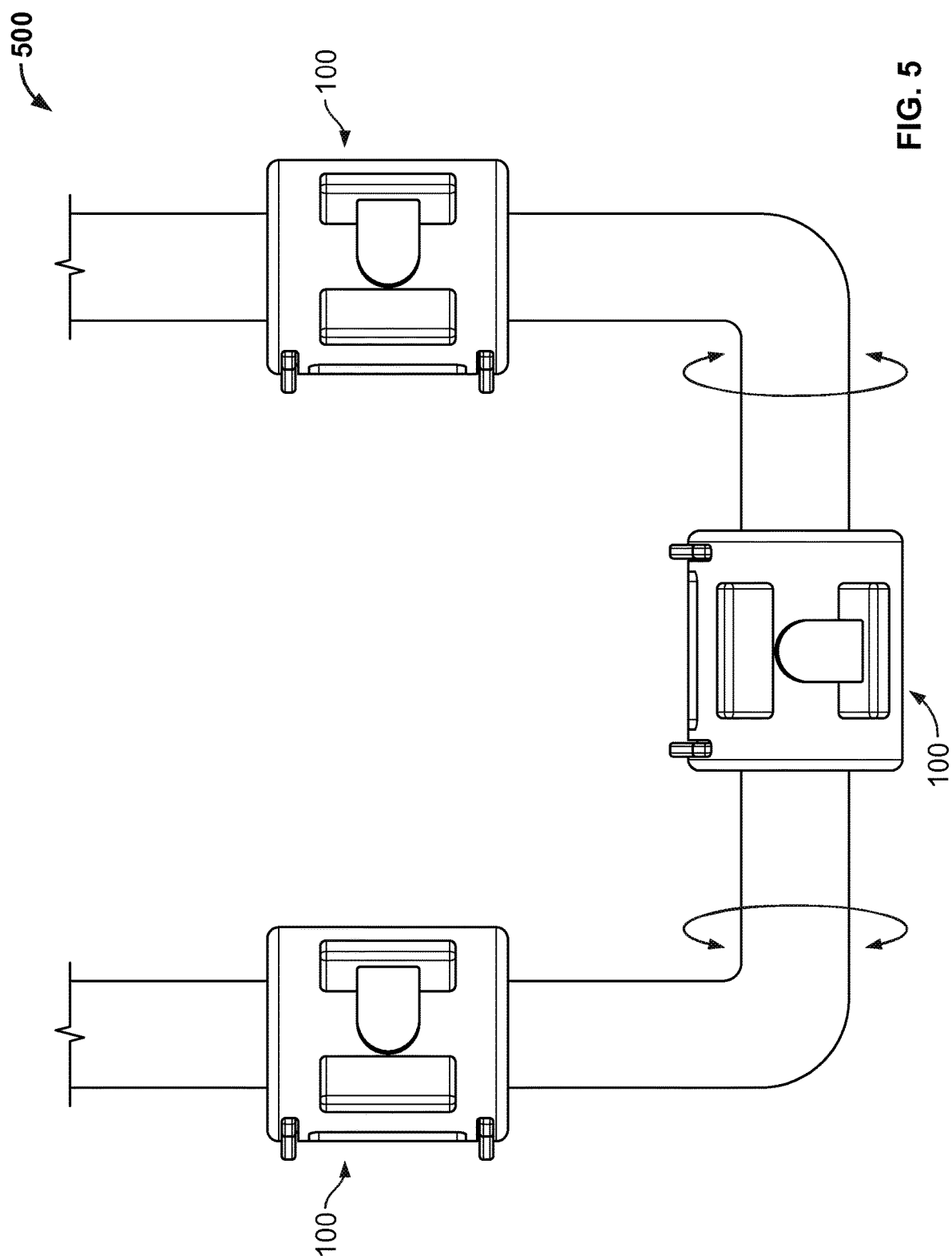
FIGS. 5-6 illustrate example implementations of portions of fluid conduit systems that include one or more tubular connectors.
Figure 6:
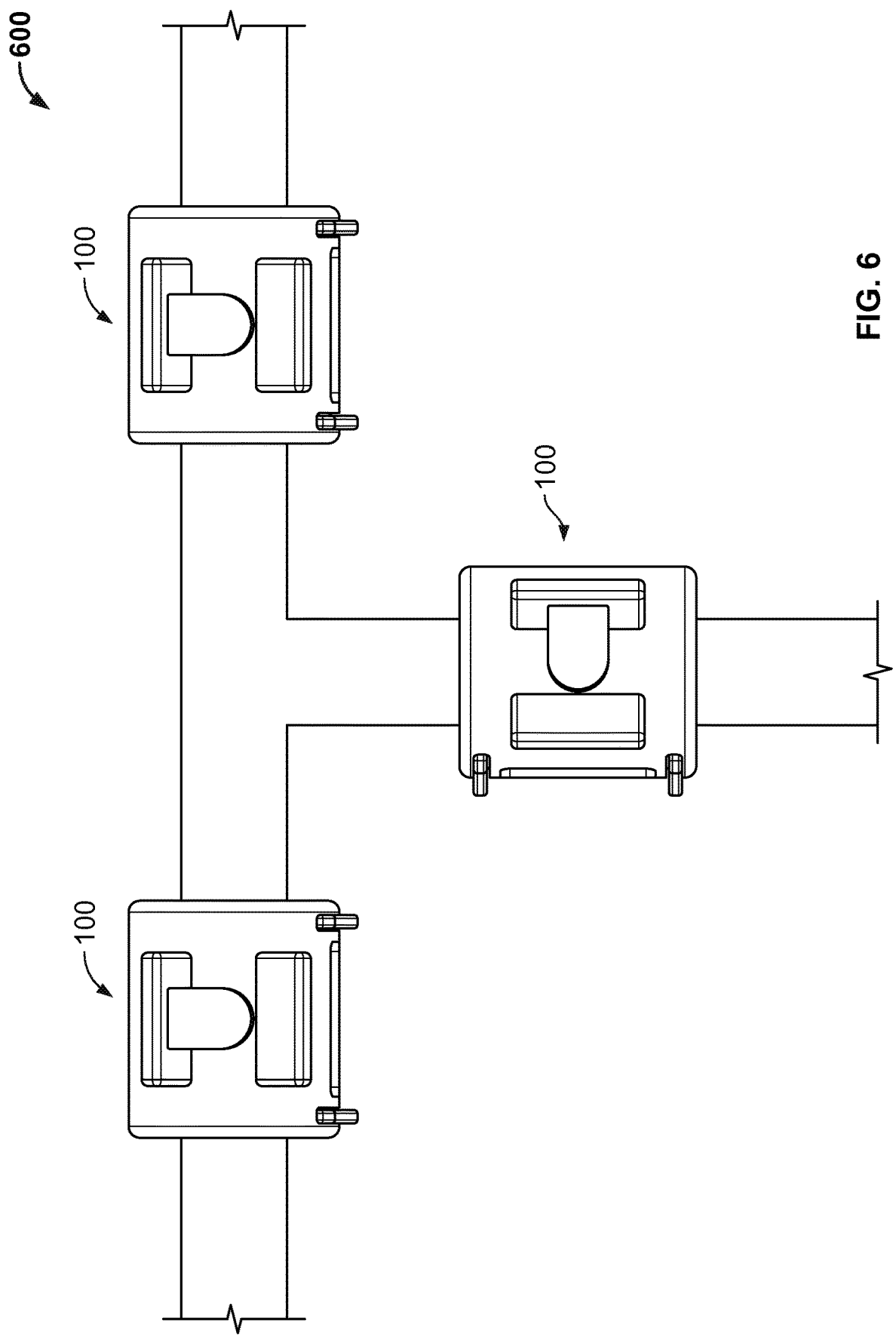

FIGS. 5-6 illustrate example implementations of portions of fluid conduit systems 500 and 600, respectively, that include one or more tubular connectors 100. As illustrated in FIG. 5, for example, a set of tubular connectors 100 forms a "u" bend, which, as illustrated by arrows, includes legs of the u-bend that may rotate. As illustrated in FIG. 6, for example, a set of tubular connectors 100 forms a "T." In both example implementations, the tubular members of the connectors 100 can rotate relative to each other. Although the tubular members of the connectors 100 are not shown completely, it is understood that they could be either straight or L-shaped. Thus, an angular position of tubular members can be varied by rotating respective connectors 100 relative to other respective connectors 100. Of course, the angular positions which the tubular members can take are infinitely variable, and the angular position of the tubular members can be adjusted during, before, or after operation of a fluid conduit system. Further, although a u-bend and T are illustrated here, other fitting, such as swivel joints, unions, butterfly valves, plug valves, etc. may include or comprises one or more tubular connectors 100.

A number of implementations have been described. Nevertheless, it will be understood that various modifications may be made. For example, example operations, methods, and/or processes described herein may include more steps or fewer steps than those described. Further, the steps in such example operations, methods, and/or processes may be performed in different successions than that described or illustrated in the figures. Accordingly, other implementations are within the scope of the following claims.

What is claimed is:

1. A tubular connector, comprising:
    a first tubular member comprising a female end;
    a second tubular member comprising a male end insertable into the female end, each of the first and second tubular members comprising a bore that extends therethrough;
    a clamp positionable about the first and second tubular members to urge the male and female ends into sealing engagement, wherein each of the first and second tubular members comprises an expanded diameter shoulder portion, and flanged ends of the clamp abut the expanded diameter shoulder portions;
    a housing that at least partially encloses the clamp such that a chamber is defined between the clamp and the housing; and
    a fastener engageable with the clamp through the housing.

2. The tubular connector of claim 1, wherein the clamp comprises a first portion and a second portion, the first and second portions urgeable together by the fastener.

3. The tubular connector of claim 1, further comprising a lock-out assembly positioned on the housing to at least partially cover the fastener.

4. The tubular connector of claim 1, wherein the fastener comprises a manually-rotatable cap coupled to a threaded rod.

5. The tubular connector of claim 1, wherein the housing comprises an oblong cross-section.

6. The tubular connector of claim 1, further including a plate positionable between an axial end of the clamp and the housing.

7. The tubular connector of claim 6, wherein the plate comprises a first plate, the connector further comprising a second plate positionable between another axial end of the clamp and the housing opposite the first plate.

8. The tubular connector of claim 7, wherein the housing comprises a respective slot to receive each of the first and second plates therethrough, each respective slot positioned near a respective axial end of the housing.

9. A tubular connector, comprising:
    a first tubular member comprising a female end;
    a second tubular member comprising a male end insertable into the female end, each of the first and second tubular members comprising a bore that extends therethrough;
    a clamp positionable about the first and second tubular members to urge the male and female ends into sealing engagement;
    a housing that at least partially encloses the clamp such that a chamber is defined between the clamp and the housing; and
    a fastener engageable with the clamp through the housing, wherein the fastener comprises a manually-rotatable cap coupled to a threaded rod.

10. The tubular connector of claim 9, wherein the clamp comprises a first portion and a second portion, the first and second portions urgeable together by the fastener.

11. The tubular connector of claim 9, further comprising a lock-out assembly positioned on the housing to at least partially cover the fastener.

12. The tubular connector of claim 9, further including a plate positionable between an axial end of the clamp and the housing.

13. The tubular connector of claim 12, wherein the plate comprises a first plate, the connector further comprising a second plate positionable between another axial end of the clamp and the housing opposite the first plate.

14. The tubular connector of claim 13, wherein the housing comprises a respective slot to receive each of the first and second plates therethrough, each respective slot positioned near a respective axial end of the housing.

15. The tubular connector of claim 9, wherein the housing comprises an oblong cross-section.

16. The tubular connector of claim 9, wherein each of the first and second tubular members comprises an expanded diameter shoulder portion, and flanged ends of the clamp abut the expanded diameter shoulder portions.

17. A tubular connector, comprising:
    a first tubular member comprising a female end;
    a second tubular member comprising a male end insertable into the female end, each of the first and second tubular members comprising a bore that extends therethrough;
    a clamp positionable about the first and second tubular members to urge the male and female ends into sealing engagement;
    a housing that at least partially encloses the clamp such that a chamber is defined between the clamp and the housing; and
    a fastener engageable with the clamp through the housing, further including a plate positionable between an axial end of the clamp and the housing.

18. The tubular connector of claim 17, wherein the clamp comprises a first portion and a second portion, the first and second portions urgeable together by the fastener.

19. The tubular connector of claim 17, further comprising a lock-out assembly positioned on the housing to at least partially cover the fastener.

20. The tubular connector of claim 19, wherein the plate comprises a first plate, the connector further comprising a second plate positionable between another axial end of the clamp and the housing opposite the first plate.

* * * * *